(12) United States Patent
Breter et al.

(10) Patent No.: US 11,902,373 B2
(45) Date of Patent: Feb. 13, 2024

(54) SMART METER BLOCK

(71) Applicant: FMC Technologies, Inc., Houston, TX (US)

(72) Inventors: James C. Breter, Houston, TX (US); Robert M. Smith, Erie, PA (US); Frederick G. Weiser, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 1131 days.

(21) Appl. No.: 16/468,925

(22) PCT Filed: Dec. 15, 2017

(86) PCT No.: PCT/US2017/066740
§ 371 (c)(1),
(2) Date: Jun. 12, 2019

(87) PCT Pub. No.: WO2018/112377
PCT Pub. Date: Jun. 21, 2018

(65) Prior Publication Data
US 2019/0320025 A1 Oct. 17, 2019

Related U.S. Application Data

(60) Provisional application No. 62/434,988, filed on Dec. 15, 2016.

(51) Int. Cl.
*H04L 67/12* (2022.01)
(52) U.S. Cl.
CPC .................. *H04L 67/12* (2013.01)
(58) Field of Classification Search
CPC ...... H04L 67/125; H04L 67/12; H04L 67/133
(Continued)

(56) References Cited

U.S. PATENT DOCUMENTS

2005/0283694 A1* 12/2005 Shabib ............... G01R 31/3187
714/733
2013/0212214 A1* 8/2013 Lawson .................. H04L 67/12
709/217
(Continued)

FOREIGN PATENT DOCUMENTS

| EP | 2 642 360 A1 | 9/2013 | |
| EP | 2642360 A1 * | 9/2013 | ............. G05B 15/02 |

OTHER PUBLICATIONS

International Search Report issued in PCT/US2017/066740 dated Mar. 26, 2018 (2 pages).
(Continued)

*Primary Examiner* — Nicholas P Celani
*Assistant Examiner* — Hien V Doan
(74) *Attorney, Agent, or Firm* — Osha Bergman Watanabe & Burton LLP

(57) ABSTRACT

A system includes a plurality of control system elements (CSEs) and a control system platform (CSP) including a data repository and operatively connected to the plurality of CSEs, and configured to: receive, from a CSE of the plurality of CSEs, a state logging message including measurement device state information (MDSI) and a control system element identifier (CSEI); store the MDSI in the data repository; process the MDSI to obtain analytic information; obtain, from the data repository, client device notification criteria (CDNC) associated with the CSEI; perform a comparison between the MDSI and the analytic information against the CDNC; determine, based on the comparison, that at least one notification trigger specified in the CDNC has been met; generate, in response to determining, an analysis notification message comprising the MDSI and the analytic information; and transmit the analysis notification message (Continued)

to a client device operatively connected to the CSP via a network.

15 Claims, 8 Drawing Sheets

(58) Field of Classification Search
USPC .......................................................... 709/220
See application file for complete search history.

(56) References Cited

U.S. PATENT DOCUMENTS

2016/0072670 A1* 3/2016 Matthieu ................. H04L 69/08
709/204
2017/0302741 A1* 10/2017 Conner .................. G08B 25/08

OTHER PUBLICATIONS

Written Opinion issued in PCT/US2017/066740 dated Mar. 26, 2018 (5 pages).

* cited by examiner

SMART METER BLOCK

CROSS-REFERENCE TO RELATED APPLICATIONS

This Application claims priority under 35 U.S.C. § 119(e) to U.S. Provisional Patent Application No. 62/434,988 filed on Dec. 15, 2016, in the United States. U.S. Provisional Patent Application No. 62/434,988 is hereby incorporated in its entirety, including all exhibits and drawings.

BACKGROUND OF INVENTION

In many industrial applications, for example in the oil and gas industry, it may be desirable to use easily replaceable hardware that contains micro-controllers. However, challenges may arise when configuring the program parameters on the replacement device. Further, the device being replaced is likely damaged, meaning one cannot easily copy out its parameters and must find the parameters elsewhere. This configuration step consumes time and effort, and is prone to mistakes. If the configuration may be placed in the cloud, then replacing the hardware may be easier.

SUMMARY OF INVENTION

This summary is provided to introduce a selection of concepts that are described further in the detailed description below. This summary is not intended to identify key or essential features of the claimed subject matter, nor is it intended to be used as an aid in limiting the scope of the claimed subject matter.

In one aspect, embodiments of the present disclosure relate to a system, comprising: a plurality of control system elements (CSEs); and a control system platform (CSP) comprising a data repository and operatively connected to the plurality of CSEs, and configured to: receive, from a CSE of the plurality of CSEs, a state logging message comprising measurement device state information (MDSI) and a control system element identifier (CSEI); store the MDSI in the data repository; process the MDSI to obtain analytic information; obtain, from the data repository, client device notification criteria (CDNC) associated with the CSEI; perform a comparison between the MDSI and the analytic information against the CDNC; determine, based on the comparison, that at least one notification trigger specified in the CDNC has been met; generate, in response to the determining, an analysis notification message comprising the MDSI and the analytic information; and transmit the analysis notification message to a client device operatively connected to the CSP via a network.

Other aspects and advantages will be apparent from the following description and the appended claims

BRIEF DESCRIPTION OF DRAWINGS

Certain embodiments of the disclosure will hereafter be described with reference to the accompanying drawings, where like reference numerals denote like elements. It should be understood, however, that the accompanying figures illustrate the various implementations described herein and are not meant to limit the scope of various technologies described herein.

DETAILED DESCRIPTION

Figure 1:
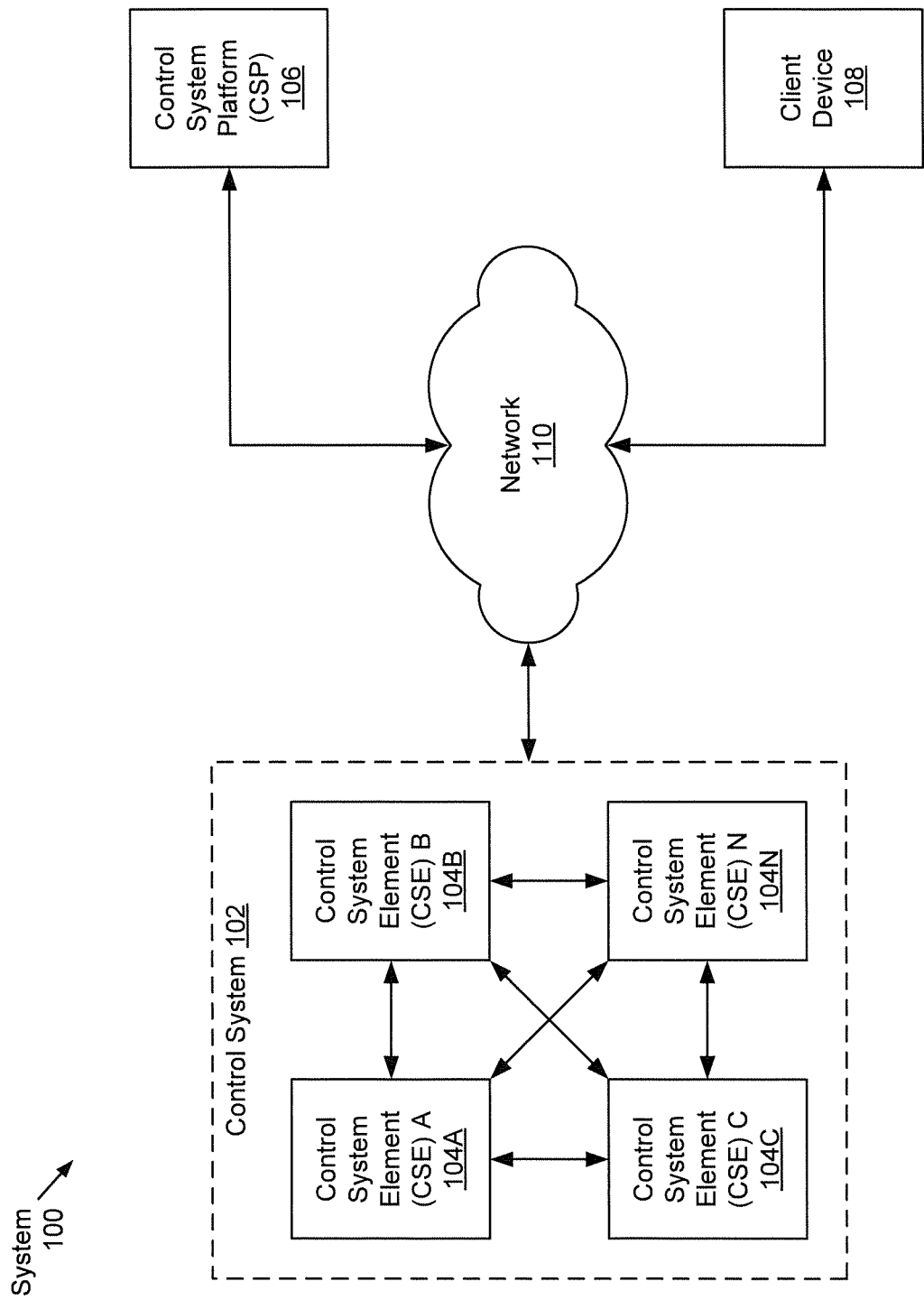
FIG. 1 shows a system in accordance with one or more embodiments of the disclosure.

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description, any component description with regard to a figure, in various embodiments of the disclosure, may be equivalent to one or more like-named components described with regard to any other figure. For brevity, descriptions of these components will not be repeated with regard to each figure. Thus each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

In general, embodiments of the disclosure relate to a control system element (CSE) for a control system, and control system platform (CSP) for providing support resources to the control system. Specifically, the one or more CSEs in the control system collectively monitor and regulate a process or machine employed for any application. In one or more embodiments of the disclosure, each CSE, also referred to as a smart meter block, subsequently captures measurements from one or more measurement device(s) and streams the captured measurements, in real-time, to the CSP. The CSP, in turn, consolidates the captured measurements, and performs computationally intensive analyses on the measurements, resulting in the obtaining of analytic information. Based on notification criteria, the CSP may then generate and transmit notifications alerting client devices of the measurements and/or analytic information that has been attained.

FIG. 1 shows a system in accordance with one or more embodiments of the disclosure. The system (100) includes a control system (102), a control system platform (CSP) (106), one or more client device(s) (108), and a network (110). Each of these components is described below.

In one or more embodiments of the disclosure, the control system (102) may be a collection of interconnected control system elements (CSEs) (104A-104N). The control system (102) may include functionality to monitor and regulate a process or a machine, whereas each CSE (104A-104N) of the control system (102) may include functionality to monitor and regulate a sub-process or component of the aforementioned process or machine, respectively. In one or more embodiments of the disclosure, the control system (102) may monitor and regulate a process or a machine relevant to the oil and gas industry. The CSE (104A-104N) is described in further detail below with respect to FIG. 2.

In one or more embodiments of the disclosure, the control system platform (CSP) (106) may be a hardware, software, and/or firmware implemented service that provides support resources for the control system (102). The support resources may include, but are not limited to, data analysis computing, data storage, control system optimization, etc. In one or more embodiments of the disclosure, the CSP (106) may be hosted on a physical server (e.g., in a data center) or on a virtual server, which may be cloud-based. The CSP (106) may be hosted on a single server, or alternatively, on multiple servers that are physical, virtual, or a combination thereof. In one or more embodiments of the disclosure, the CSP (106) may be hosted on any one or more computing system(s) similar to the exemplary computing systems shown in FIGS. 6A and 6B.

In one or more embodiments of the disclosure, the CSP (106) may include functionality to: (i) receive configuration request messages from one or more CSEs (104A-104N); (ii) generate configuration response messages or obtain configuration response messages from a client device (108); (iii) transmit configuration response messages to one or more CSEs (104A-104N); (iv) receive state logging messages from one or more CSEs (104A-104N); (v) process measurement device state information (MDSI) included in state logging messages to obtain analytic information; (vi) generate analysis notification messages using analytic information and based on client device notification criteria (CDNC) (discussed below); (vii) transmit analysis notification messages to a client device (108); (viii) receive control instruction messages from a client device (108); and (vix) transmit control instruction messages to one or more CSEs (104A-104N). The CSP (106) is discussed in further detail below with respect to FIG. 3.

In one or more embodiments of the disclosure, a client device (108) may be any computing system (see e.g., FIGS. 6A and 6B) that may interface with any of the one or more CSEs (104A-104N) and/or the CSP (106) via the network (110). A client device (108) may include functionality to: (i) generate and transmit control instruction messages to one or more CSEs (104A-104N) and/or the CSP (106); (ii) receive configuration request messages from the CSP (106); (iii) generate and transmit configuration response messages to the CSP (106); (iv) receive analysis notification messages from the CSP (106); and (v) access any state information (e.g., MDSI, software and/or firmware revision information, user configurable information (discussed below), etc.) stored locally on one or more CSEs (104A-104N) and/or the CSP (106). Examples of a client device (108) include, but are not limited to, a cellular telephone, a smartphone, a personal digital assistant (PDA), a gaming console, a laptop computer, a desktop computer, a computer server, an Internet-enabled appliance, a smart television, a tablet computer, an electronic reader, and the like.

In one or more embodiments of the disclosure, the network (110) may be a medium through which the control system (102), the CSP (106), and the one or more client device(s) (108) are operatively (or communicatively) connected. The connections between these various components of the system (100) may be wired and/or wireless, direct or indirect, temporary, permanent, and/or intermittent, manifested through a local area network (LAN) or a wide area network (WAN) such as the Internet, or characterized as any other type of connection, or combination thereof. In one or more embodiments of the disclosure, the network (110) may be implemented using any one or more computing system(s) similar to the exemplary computing systems shown in FIGS. 6A and 6B. Further, the network (110) may employ any existing or future developed wired and/or wireless protocols, or a combination thereof, directed to the facilitation of communications and the exchange of information between at least the various components of the system (100).

Figure 2:
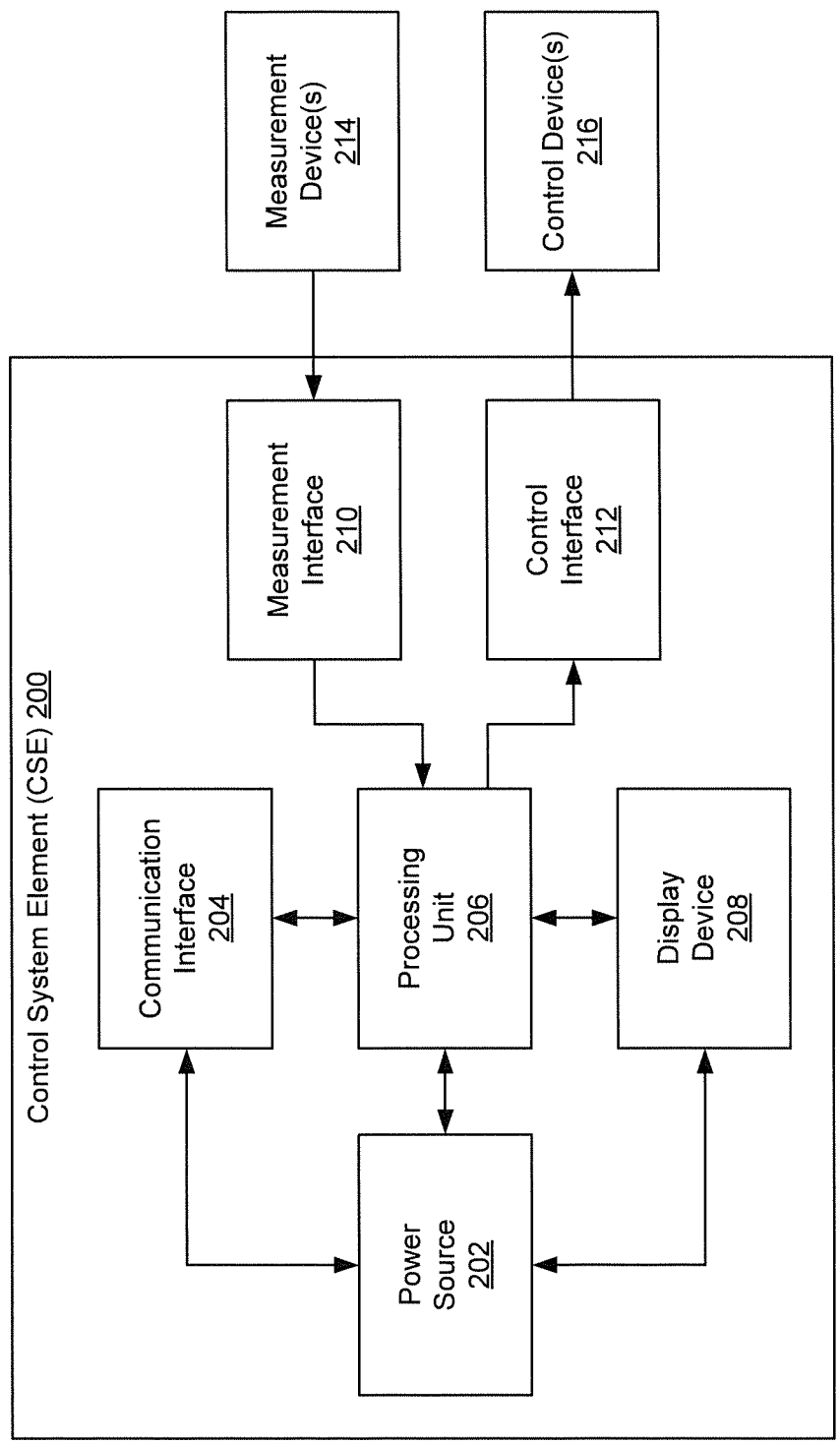
FIG. 2 shows a control system element in accordance with one or more embodiments of the disclosure.

FIG. 2 shows a control system element (CSE) in accordance with one or more embodiments of the disclosure. As mentioned above, the CSE (200) may be a programmable, physical device for monitoring and regulating a sub-process or component of a process or machine, respectively. The CSE (200) includes a power source (202), a communication interface (204), a processing unit (206), a display device (208), a measurement interface (210), and a control interface (212). Each of these components is described below.

In one or more embodiments, the CSE (200) may be a low cost, minimalistic, networkable, data consuming device, with the capability to communicate raw data through open communications protocols to users who can digest the data through common tools and communicate back to the block in the same methods. The CSE (200) may eliminate the expense of today's multi-layered hardware infrastructure and specialized tools, reducing the overall cost for system integration, data collection, and data consumption/diagnostic capabilities.

In one or more embodiments of the disclosure, a CSE (200) may be described as: (a) a networking device that aggregates sensor information and disseminates control signaling; (b) a minimalistic device which does not require specialized end-user programming and requires minimal user configuration; (c) a device that is information-consumption-centric allowing widely common platforms and tools to easily consume data; (d) a device that eliminates many of the commonly used information translation devices in the chain of information-producer (sensor) to information-consumer (host processing) (e.g., Programmable Logic Controllers (PLCs), Flow Computers, Supervisory Control and Data Acquisition (SCADA), and the like); (e) a device that may be heavily leveraged on open communication protocols; (f) a device that may use HTTP for a client-server paradigm and Message Queuing Telemetry Transport (MQTT) for a publisher-subscriber paradigm; (g) a device that may be small in footprint and conducive of integration into the sensors themselves (lowering system cost); (h) a device that may stream raw measurement data for upstream computation, analysis, logging, failure identification, and prediction; (i) a device that may have a web-server interface for user/ browser interaction and machine-to-machine interaction; (j) a device that may be used as the common networking interface for each of the various sensors and actuators at and on a "digital oil pad" as well as elsewhere; (k) a device that may securely send and receive information via standards-based cryptographic methods (e.g., encryption, endpoint authentication, and the like); (l) a device that may be uniquely identified as being associated with one or more sensors and actuators generically; (m) a device that may be Ethernet daisy chained; (n) a device that may be capable of closed-loop control; (o) a device that may be accessed by a smartphone, a tablet, or any other browser capable device; (p) a device that may be capable of direct device-to-cloud communications; (q) a device that may contain a CPLD (complex programmable logic device) or FPGA (field programmable gate array) for real-time information capture; and (r) a device that may be low cost.

In one or more embodiments of the disclosure, CSEs may be networked, low cost, "plug-n-play", built for purpose modules that may be utilized together in a true distributed monitoring and process control system. CSEs may identify themselves on the network and communicate their functionality. Thus, creating a set of technologies that may be put together in such a manner as to take advantage of older customer communication structures is an efficient manner allowing utilization of well-known lesser technologies together in a novel way for the digital oil field or elsewhere.

In one or more embodiments of the disclosure, the CSE may include functionality to stream raw data for analysis in real-time. In contrast, PLCs are typically not contemplated as the devices to use for streaming raw data as PLCs are not designed for such functionality. In one or more embodiments of the disclosure, a CSE may obtain real-time data and convert the data to non-real-time data. To this end, the CSE may append time stamps to captured data to facilitate off-site (non-real-time) analysis of the data.

In one or more embodiments of the disclosure, CSEs can communicate with one another. The information that may be exchanged may include, but is not limited to, measurement information which may traverse through one or more CSEs from an originating CSE toward a network and associated upstream devices.

In one or more embodiments of the disclosure, a CSE may be approximately 3 inches in length, 3 inches in width, and 1.375 inches in height. In one or more embodiments of the disclosure, a CSE may be panel or DIN rail mounted. However, a CSE is not limited to the configuration and specifications disclosed above.

In one or more embodiments, a CSE may be a simple device, where "simple" is understood to mean being as "stateless" as possible, in other words, with as few program parameters as possible. Advantageously, a CSE may (a) be small in size and relatively inexpensive, (b) have a simpler design that makes the CSE easier to build and test than current devices, (c) have fewer start-up parameters, making it easier to commission, (d) be easier to replace after it has been commissioned, and (e) move computing complexity to other computing resources that are more capable of performing more complex computations.

However, there may be cases when having more complex computations being done by the CSE are desirable. For example, when the calculation results are needed local to the CSE (or neighbors). This may be especially evident for real time data needed for control purposes, and even more true when slow reporting rates are configured to relieve communications burden to the cloud (e.g., 10-minute reporting cycles to conserve money on expensive satellite links).

As another example, the algorithm may be unique and proprietary. The intellectual property may more likely be controlled in a CSE implementation than licensing the same code for cloud use. Further, it may relieve the customer from implementing the algorithm in the cloud application.

The disadvantage of maintaining the associated programming parameters (when replacing a module, for example) may be mitigated if the cloud application is the place where the parameters originate; thus, the cloud application now may handle the parameters rather than a technician. This may mean the cloud application now "activates" the more complex function in the CSE by taking the action of forwarding the necessary parameters to enable the CSE to execute the algorithm.

As an example, consider a CSE configured to interface with a meter. Given no parameters at all except the CSEI and how the CSE may be connected to its MQTT broker, the CSE can count pulses and output a pulse rate in units of Hz. This may be illustrated below to show the relationship between CSE function and an application located in the cloud.

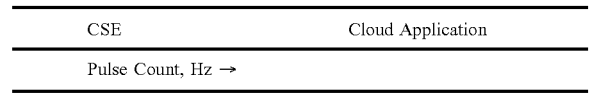

| CSE | Cloud Application |
|---|---|
| Pulse Count, Hz → | |

If the cloud application provides the K-factor to the CSE, then the CSE may output indicated volume (IV) and flow rate:

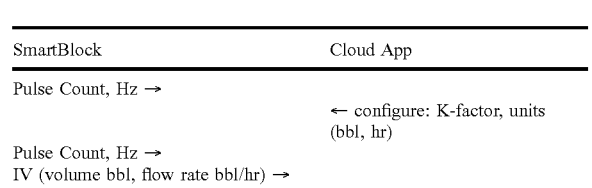

| SmartBlock | Cloud App |
|---|---|
| Pulse Count, Hz → | |
| | ← configure: K-factor, units (bbl, hr) |
| Pulse Count, Hz → | |
| IV (volume bbl, flow rate bbl/hr) → | |

Further, if the cloud application provides the CSE with the meter factor, or which meter factor table to use (i.e., flow rate vs. meter factor), then the CSE may output gross volume (GV) and flow rate:

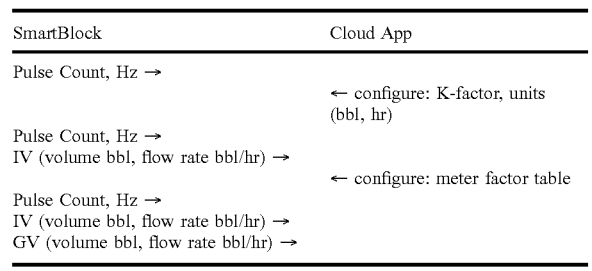

| SmartBlock | Cloud App |
|---|---|
| Pulse Count, Hz → | |
| | ← configure: K-factor, units (bbl, hr) |
| Pulse Count, Hz → | |
| IV (volume bbl, flow rate bbl/hr) → | |
| | ← configure: meter factor table |
| Pulse Count, Hz → | |
| IV (volume bbl, flow rate bbl/hr) → | |
| GV (volume bbl, flow rate bbl/hr) → | |

In one or more embodiments, certain sets of parameters may be stored in the cloud rather than in the CSE. If the could does not provide any parameters, as discussed above, the CSE may output only basic data, for instance pulse counts and frequency. If the cloud requires more, then the cloud need only supply the parameters needed to carry out the computations to the CSE.

MQTT may also help provide parameters by using its "retain" feature: when the cloud application sends the required parameters, the application uses the retain flag. The MQTT broker then forwards the parameters again anytime the CSE disconnects for any reasons, without further burdening the cloud application.

In one or more embodiments, the CSE may support integrity of measurement. When the CSE receives a parameter set that enables a calculation, the CSE may include a signature of the parameters with each frame of output data. The signature may then by checked by recipients of the output data to verify that the correct parameters were used to calculate the output data. This may be done to ensure and verify that calculations were done in accordance with various regulatory agencies and their rules. In other words, the parameters used in the calculations were set in compliance with one or more regulatory agency rules. Thus, the parameters or a signature of the parameters in lieu of the parameters themselves may be used to provide the same assurances. In one or more embodiments, the signature may be of a cryptographic nature, perhaps a hash including a "secret," thus relating back to a trusted entity that commissioned the system. In one or more embodiments, this method also allows data recipients to quickly verify if parameters that were used to produce the output data, i.e., the MDSI, have changed, as the signature would be different from previous packets.

In one or more embodiments of the disclosure, a power source (202) may be any direct current (DC) power source that provides power to one or more components (e.g., communication interface (204), processing unit (206), display device (208)) of the CSE (200). The power source (202) may be capable of distributing an appropriate amount of power to each component to which it is operatively connected. In one or more embodiments of the disclosure, the power source (202) may be a rechargeable DC storage device, such as a battery. In one or more embodiments of the disclosure, the power source (202) may include a management system (not shown) programmed to oversee the charging and discharging of power to and from the power source (202). The management system may also monitor measurements pertinent to the operation and regulation of the power source (202) such as, for example, temperature, pressure, leakage, energy, etc. In one or more embodiments of the disclosure, the power source (202) may be operatively connected to an external power source (not shown). The external power source may supply DC or alternating current (AC) power to the power source (202). In embodiments where AC power is supplied, the power source (202) may further include a power conversion module (not shown). In one or more embodiments of the disclosure, the power conversion module may include circuitry that converts the supplied AC power into DC power. The power conversion module may also include circuitry that translates AC or DC power from a first voltage level to one or more second voltage levels to accommodate the power specifications of each component to which it is operatively connected. In one or more embodiments, the power source (202) may be solar power.

In one or more embodiments of the disclosure, the communication interface (204) may be hardware, software, firmware, or any combination thereof, which enables the CSE (200) to remain operatively (or communicatively) connected to the various components of the system described above in FIG. 1. The communication interface (204) may include functionality to: (i) encapsulate outgoing information (e.g., measurement device state information (MDSI)) based on any wired and/or wireless communication protocol to obtain encapsulate outgoing information; (ii) encode the encapsulated outgoing information using any encryption scheme to obtain encrypted outgoing information; (iii) transmit the encrypted outgoing information towards the CSP, another CSE, or a client device; (iii) receive encrypted incoming information from the CSP, another CSE, or a client device; (iv) decode the encrypted incoming information using any decryption scheme to obtain encapsulated incoming information; and (v) decapsulate the encapsulated incoming information based on any wired and/or wireless communication protocol to obtain incoming information (e.g., control system element configuration (CSEC), control system element update (CSEU), etc.). Examples of the communication interface (204) include, but are not limited to, an Ethernet port, a network interface controller, a network interface device, a network socket, an antenna, and the like.

In one or more embodiments of the disclosure, the processing unit (206) may be/include one or more integrated circuit(s) for processing instructions. The instructions processed by the processing unit (206) may correspond to computer readable program code, which when executed by the processing unit (206), enable the processing unit (206) to manage the components of the CSE (200) to which it is operatively connected and oversee the operations of the sub-process or component of a process or machine, respectively, that which the CSE (200) monitors and regulates. In one or more embodiments of the disclosure, the computer readable program code may also be referred to as control system logic (CSL) in this disclosure. In one or more embodiments of the disclosure, the processing unit (206) may include functionality to process MDSI (obtained from one or more measurement device(s) (214) via the measurement interface (210)) in accordance with the CSL to obtain control device state information (CDSI) (e.g., control signals and/or data). The CDSI may subsequently be transmitted to one or more control device(s) (216) via a control interface (212). The processing unit (206) may include further functionality to obtain incoming information from and provide outgoing information to the communication interface (204) and/or the display device (208). The processing unit (206) may further include non-persistent storage (e.g., volatile memory such as random access memory (RAM) and cache memory) and/or persistent storage (e.g., a hard disk or flash memory). Examples of the processing unit (206) include, but are not limited to, a discrete processor, a digital signal processor (DSP), an application specific integrated circuit (ASIC), a microcontroller, a field programmable gate array (FPGA), a single-board computer, or any combination thereof.

In one or more embodiments of the disclosure, the display device (208) may be an output device for visually presenting state information and user configurable information. State information may include, but is not limited to, a control system element identifier (CSEI) associated with or assigned to the CSE (200), MDSI (e.g., measurements from one or more measurement device(s) (214)), version or revision information associated with the software executing and/or firmware implemented on the CSE (200), status and alert messages affiliated with the power source (202) and connections established via the communication interface (204), and the like. User configurable information may include, but is not limited to, tags or messages uploaded to the CSE (200) from a client device operated by a user. In one or more embodiments of the disclosure, the tags or messages may be representative of notes, comments, descriptions, etc. pertinent to the CSE (200) and/or the sub-process or component of the process or machine, respectively, that the CSE (200) monitors and regulates. Examples of the display device (208) include, but are not limited to, a liquid crystal display (LCD), a light emitting diode (LED) display, an electroluminescent display (ELD), an interferometric modulator display (IMOD), and the like.

In one or more embodiments of the disclosure, the measurement interface (210) may be hardware, software, firmware, or any combination thereof, which enables the CSE (200) to monitor a sub-process or component of a process or machine, respectively. The measurement interface (210) may include circuitry and/or device(s), which provide the measurement interface (210) functionality to: (i) sample output(s) (e.g., obtaining raw measurement data) from one or more measurement device(s) (214) operatively connected to the CSE (200); and (ii) normalize or otherwise pre-process the sampled output(s). By way of an example, the measurement interface (210) may include signal conditioning circuitry, and/or include a data acquisition module. In one or more embodiments, the measurement interface (210) may include one or more of the following input interfaces: resistance sensor inputs, (e.g., for a four-wire resistance temperature detector (RTD)), current sensor inputs (e.g. 4-20 mA inputs), voltage sensor inputs, single pulse inputs, dual pulse inputs, reluctance pickup inputs, microphone inputs, accelerometer inputs, and digital bi-state DC inputs. The measurement interface (210) may include a plurality of any of these types of inputs. One skilled in the art will readily recognize that other inputs may be included.

In one or more embodiments of the disclosure, a portion of the input/output signals/data may traverse through a Complex Programmable Logic Device (CPLD) or a Field Programmable Gate Array (FPGA) on its way from/to the one or more input/output interfaces. The CPLD or FPGA may include, but is not limited to, output registers, pulse generators, accumulators, capture registers, rate counters, etc. The CPLD or FPGA may also be operatively connected to the processing unit (e.g., CPU). In one or more embodiments of the disclosure, another portion of the input/output signals/data may converge at an analog-to-digital (A/D) conversion module, which converts the received, analog signals/data to digital representations. The digital representations may then be provided to the processing unit. In one or more embodiments of the disclosure, yet another portion of the input/output signals/data may be provided directly to the processing unit without further pre-processing, transformation, or the like.

In one or more embodiments of the disclosure, a measurement device (214) may be a physical device that includes one or more sensor(s) (not shown). A sensor may be hardware, software, firmware, or any combination thereof, which detects and measures one or more physical properties (e.g., heat, light, vibration, sound, pressure, motion, and the like). Moreover, the measurement device (214) may include functionality to encode measurements pertaining to one or more physical properties into an analog and/or digital signal that may be interpreted by the measurement interface (210) on the CSE (200). Examples of sensors include, but are not limited to, an accelerometer, a pressure sensor, a temperature sensor, a microphone, a camera, a light detector, a strain gauge, a voltage meter, a resistance sensor, and the like.

In one or more embodiments of the disclosure, the control interface (212) may be hardware, software, firmware, or any combination thereof, which enables the CSE (200) to regulate a sub-process or component of a process or machine, respectively. The control interface (212) may include circuitry and/or device(s), which provide the control interface (212) functionality to provide control signals and/or data to one or more control device(s) (216) operatively connected to the CSE (200). By way of an example, the control interface (210) may include actuation driving circuitry (e.g., an H bridge) or provide actuation driving signals (e.g., pulse-width modulation (PWM) signals).

In one or more embodiments of the disclosure, a control device (216) may be a physical device that includes one or more actuator(s) (not shown). An actuator may include, but is not limited to, an electrical, piezoelectric, electro-mechanical, mechanical, or hydraulic device, or any combination thereof, which produces an actuation proportional to the control signals and/or data provided by the control interface (212). In one or more embodiments of the disclosure, the nature of the actuation may be kinetic, sensory, thermal, chemical, auditory, visual, and/or any other type of nature. Examples of actuators include, but are not limited to, a motor, a fluidic pump, a piezoelectric element, a speaker, a valve, a heater, a cooler, automated surface equipment, metrological and custody transfer equipment, and the like.

Figure 3:
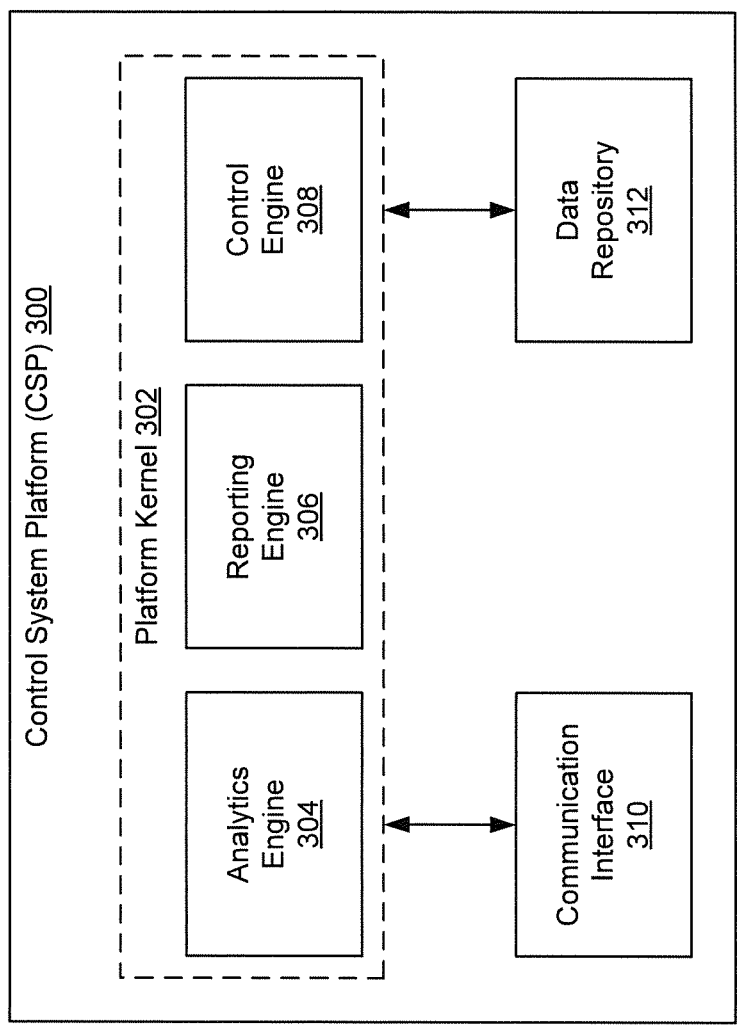
FIG. 3 shows a control system platform in accordance with one or more embodiments of the disclosure.

FIG. 3 shows a control system platform (CSP) in accordance with one or more embodiments of the disclosure. As mentioned above, the CSP (300) may be a hardware, software, and/or firmware implemented service that provides support resources for the control system (see e.g., FIG. 1). The CSP (300) includes a platform kernel (302), a communication interface (310), and a data repository (312). Each of these components is described below.

In one or more embodiments of the disclosure, the platform kernel (302) may be hardware, software, firmware, or any combination thereof, which may include functionality to manage the operations of the CSP (300). In one or more embodiments of the disclosure, the platform kernel (302) may be implemented as one or more computer processors containing integrated circuitry. In one or more other embodiments of the disclosure, the platform kernel (302) may be an operating system (representative of computer readable program code) executing on the one or more computer processors of any underlying hardware, such as a physical server or a computing system similar to the exemplary computing systems shown in FIGS. 6A and 6B. The platform kernel (302) includes an analytics engine (304), a reporting engine (306), and a control engine (308). Each of these sub-components is described below.

In one or more embodiments of the disclosure, the analytics engine (304) may include software instructions corresponding to computer readable program code executing on the underlying hardware of the CSP (300). Further, when executed by one or more computer processor(s) of the underlying hardware, the software instructions may enable the platform kernel (302) to perform analyses on any information stored locally on the CSP (300) (including, but not limited to, recently obtained and/or historical measurement device state information (MDSI) derived from one or more CSEs). The data and/or information resulting from the performance of these analyses may be collectively referred to as analytic information in this disclosure. In one or more embodiments of the disclosure, the analyses performed may pertain to applications including, but not limited to: (i) vibration and signature analysis and pattern recognition resulting in flow-meter wear prediction, failure prediction, blade-tip clearance prediction (e.g., substantive to "blade knock", blade bending, bearing integrity, hydraulic shock, turbine wobble, and the like), pump wear prediction, and energy optimization; (ii) endpoint authentication and encryption for data integrity preservation and secure data communications; (iii) closed-loop control functionality and optimization; (iv) time and volume stamping for network-based leak detection; (v) actuator (e.g., solenoid, valve, and the like) life prediction; (vi) pipeline product-interface detection (e.g., the detection of changes of product flowing through a pipeline); (vii) exception detection; and (viii) diagnostic monitoring and computations. In one or more embodiments of the disclosure, the analytics engine (304) may employ any existing data manipulation and/or analysis technique or algorithm, or a combination thereof, towards performing analyses directed to one or more of the aforementioned applications.

In one or more embodiments of the disclosure, the reporting engine (306) may include software instructions corresponding to computer readable program code executing on the underlying hardware of the CSP (300). Further, when executed by one or more computer processor(s) of the underlying hardware, the software instructions may enable the platform kernel (302) to: (i) compare analytic information (e.g., results obtained from the performance of the above-mentioned analyses) against a client device notification criteria (CDNC) for an appropriate client device; and (ii) generate, based on the analytic information meeting one or more of the CDNC, analysis notification messages using/including at least a portion of the analytic information to subsequently transmit to the appropriate client device. In one or more embodiments of the disclosure, the appropriate client device may be identified using a locally-stored mapping relating the one or more CSEs (or control system) with which the analytic information is associated with particular client device information (CDI). The CDI pertaining to an appropriate client device may be representative of a client profile that may include, but is not limited to, the CDNC, client preferences directed to analytic information computation and presentation, protocols for the transmission of analysis notification messages, network identification information (e.g., a unique Internet Protocol (IP) address associated with the appropriate client device), and the like.

In one or more embodiments of the disclosure, the CDNC may specify one or more time-based and/or event-based triggers. Further, the CDNC may be configurable by a user of an appropriate client device. In one or more embodiments of the disclosure, a time-based trigger may specify an exact time or a span/duration of time. As such, a time-based trigger specifying an exact time may be met by, for example, an internal clock of the CSP (300) reaching a specific time of day (e.g., noon, midnight, 8:00 AM, etc.), a specific day of the week, and the like. Moreover, a time-based trigger specifying a span/duration of time may be met by, for example, a timer internal to the CSP (300) elapsing after being set to countdown from a configurable interval of time (e.g., sub-seconds, seconds, minutes, hours, etc.). The timer may be continuously be reset to countdown from a configurable interval of time (after elapsing each iteration) to enable the periodic scheduling and transmission of analysis notification messages to an appropriate client device. In one or more embodiments of the disclosure, an event-based trigger may specify a value (or a range of values) corresponding to a measurement and/or a metric. As such, an event-based trigger specifying a measurement value (or range of values) may be met when, for example, MDSI is determined to exceed, fall below, and/or be equal to the measurement value (or is within and/or outside the range of measurement values). Similarly, an event-based trigger specifying a metric value (or range of values) may be met when, for example, analytic information is determined to exceed, fall below, and/or be equal to the metric value (or is within and/or outside the range of metric values).

In one or more embodiments of the disclosure, the control engine (308) may be software instructions corresponding to computer readable program code executing on the underlying hardware of the CSP (300). Further, when executed by one or more computer processor(s) of the underlying hardware, the software instructions enable the platform kernel (302) to: (i) locally search for a control system element configuration (CSEC) or obtain a CSEC from an appropriate client device in response to receiving a configuration request message from a CSE; (ii) obtain (from the appropriate client device) or locally generate configuration response messages using/including an obtained CSEC; and (iii) obtain (from the appropriate client device) or locally generate control instruction messages using/including a control system element update (CSEU).

In one or more embodiments of the disclosure, a CSEC may be software instructions corresponding to computer readable program code that may be executed by the processing unit (see e.g., FIG. 2) of a CSE. The CSEC, when executed by the processing unit of a CSE, may enable the CSE to realize one or more functionalities of a CSE (as described above) in accordance with embodiments of the disclosure. Further, the CSEC may include, but is not limited to, configuration and/or operational settings (e.g., variables and corresponding variable values), relational algebraic statements, control system logic (CSL) routines, software and/or firmware binaries, libraries, and the like. In one or more embodiments of the disclosure, a CSEU may be software instructions corresponding to computer readable program code that may also be executed by the processing unit of a CSE. The CSEU may include substantially similar components as a CSEC, however, whereas the CSEC may correspond to software instructions directed to an initialization of a CSE, the CSEU may correspond to software instructions directed to adjustments and/or updates to one or more of the aforementioned components of a CSEC.

In one or more embodiments of the disclosure, the communication interface (310) may be hardware, software, firmware, or any combination thereof, which enables the CSP (300) to remain operatively (or communicatively) connected to the various components of the system described above in FIG. 1. The communication interface (310) may include functionality to: (i) receive encrypted incoming information (e.g., configuration request messages and state logging messages from CSEs, configuration response messages and control instruction messages from a client device, etc.); (ii) decode the encrypted incoming information using any decryption scheme to obtain encapsulated incoming information; (iii) decapsulate the encapsulated incoming information based on any wired and/or wireless communication protocol to obtain incoming information (e.g., CSEC, CSEU, MDSI, etc.); (iv) encapsulate outgoing information (e.g., CSEC, CSEU, analytic information, etc.) based on any wired and/or wireless communication protocol to obtain encapsulated outgoing information; (v) encode the encapsulated outgoing information using any encryption scheme to obtain encrypted outgoing information (e.g., configuration response messages and control instruction messages to CSEs, analysis notification messages and configuration request messages to a client device, etc.); and (vi) transmit the encoded outgoing information towards one or more CSE(s) and/or a client device. Examples of the communication interface (310) include, but are not limited to, an Ethernet port, a network interface controller, a network interface device, a network socket, an antenna, etc.

In one or more embodiments of the disclosure, the data repository (312) may be any type of storage unit, data structure, and/or device (e.g., a file system, a database, a collection of tables, or any other storage mechanism) for temporarily storing and/or permanently consolidating any information pertinent to embodiments of the disclosure, such as MDSI, analytic information, CSECs, CSEUs, client device information (CDI) (including client device notification criteria (CDNC)), mappings relating one or more CSEs (or a control system) to CDI associated with an appropriate client device, and the like. In one or more embodiments of the disclosure, the data repository (312) may be implemented using multiple storage units, data structures, and/or devices, which may or may be of the same type and/or located at the same physical site. Examples of a data repository (312) may include, but are not limited to, solid state drives, optical disc drives, magnetic storage, or any other persistent and non-volatile storage medium.

Figure 4A:
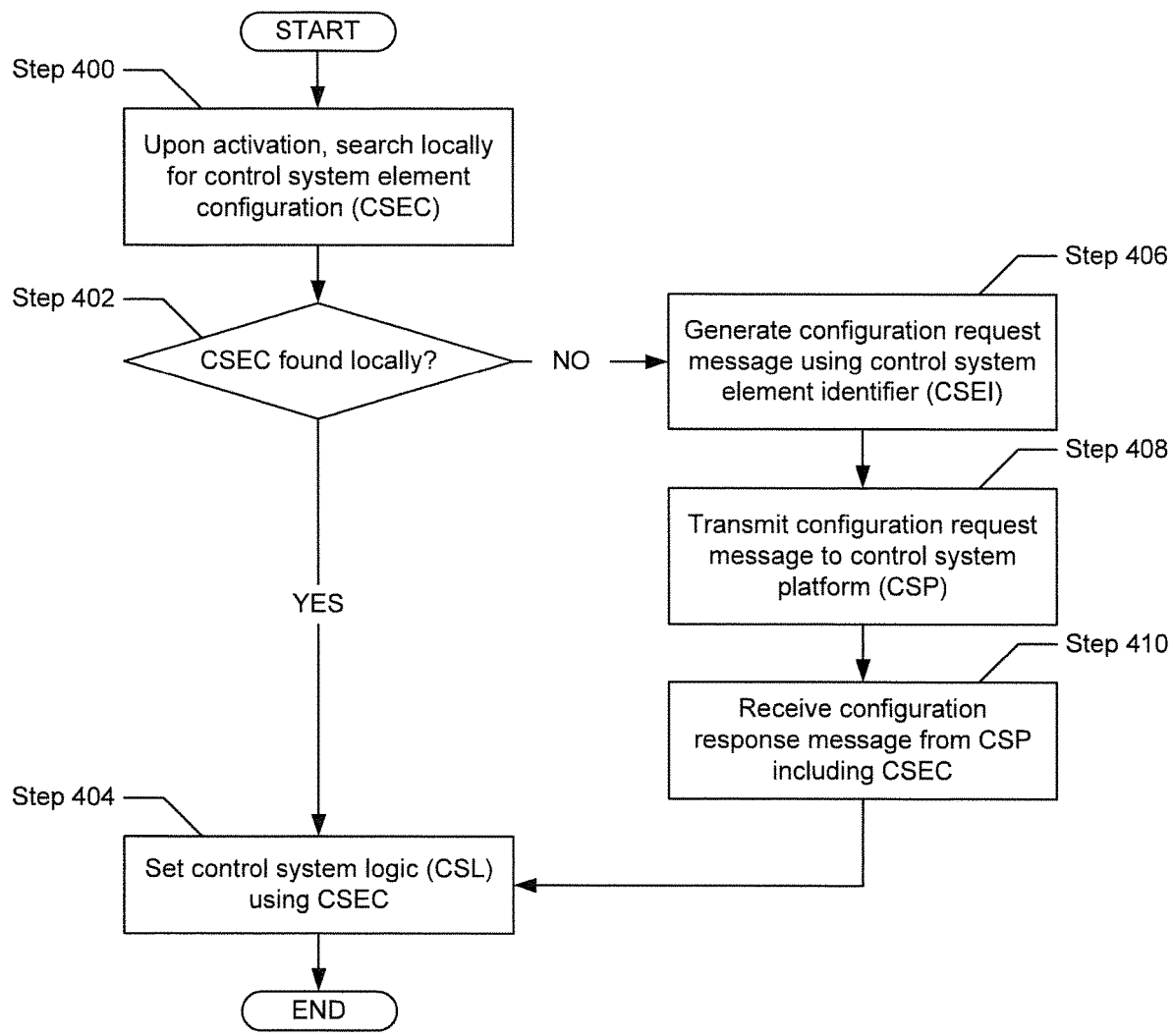
FIG. 4A shows a flowchart in accordance with one or more embodiments of the disclosure.

FIG. 4A shows a flowchart describing a method for setting control system logic (CSL) of a control system element (CSE) in accordance with one or more embodiments of the disclosure. In Step 400, upon activation, a local search for a control system element configuration (CSEC) is performed. As discussed above, in one or more embodiments of the disclosure, the CSEC may be software instructions corresponding to computer readable program code that is pertinent to the initialization of a CSE. Specifically, in one or more embodiments of the disclosure, the CSEC may provide software instructions, which dictate how a CSE may monitor and regulate a sub-process or component of a process or machine, respectively, via interactions with one or more measurement device(s) and one or more control device(s), and further, what information to share with the various other components of the system (as discussed above in FIG. 1). In one or more embodiments of the disclosure, performing a local search may involve accessing non-persistent and/or persistent storage on the CSE and looking for a CSEC, which in one or more embodiments of the disclosure may be associated with a generic file name or a specific file extension.

In Step 402, a determination is made as to whether a CSEC has been found locally. If it is determined that the local search (performed in Step 400) has resulted in the locating of a CSEC, the process proceeds to Step 404. On the other hand, if it is determined that the local search has been unable to locate a CSEC, the process proceeds to Step 406.

In Step 404, after determining that a CSEC has been found locally, or alternatively, after obtaining a CSEC from the control system platform (CSP) (see e.g., Step 410 (discussed below)), the control system logic (CSL) of the CSE is set/initialized using the CSEC. As discussed above, in one or more embodiments of the disclosure, the CSL may correspond to hardware, software, firmware, or any combination thereof, of the CSE, which directs, monitors, and/or regulates at least the control system functionalities of the CSE. In one or more embodiments of the disclosure, the CSEC may be a script in any programming language, which mandates the behavior of the CSE in a control system.

In Step 406, after determining that a CSEC has not been found locally, a configuration request message is generated. In one or more embodiments of the disclosure, the configuration request message may be generated to include (or using) at least a control system element identifier (CSEI). The CSEI may be a unique identifier associated with the CSE requesting the CSEC. In one or more embodiments of the disclosure, the CSEI may be a string of characters (e.g., letters, numbers, symbols, etc.) of any predefined length. In one or more other embodiments of the disclosure, the CSEI may an Internet Protocol (IP) address associated with (or assigned to) the CSE.

In Step 408, the configuration request message (generated in Step 406) is transmitted. In one or more embodiments of the disclosure, the configuration request message may be transmitted using any wired and/or wireless communication protocol, and may traverse through any wired and/or wireless network towards reaching its destination. The destination of the configuration request message may be the CSP. One of ordinary skill in the relevant art would appreciate that the configuration request message may be transmitted in the form of one or more network data packets.

In Step 410, a configuration response message is received. In one or more embodiments of the disclosure, the configuration response message may traverse through any wired and/or wireless network, and employ any wired and/or wireless communication protocol, in arriving at the CSE from its source. The source of the configuration response message may be the CSP. Further, the configuration response message may be received in response to the transmitting of the configuration request message (in Step 408). In one or more embodiments of the disclosure, the configuration response message may include at least a CSEC for the requesting CSE. One of ordinary skill in the relevant art would appreciate that the configuration response message may be received in the form of one or more network data packets. From Step 410, the process proceeds to Step 404.

Figure 4B:
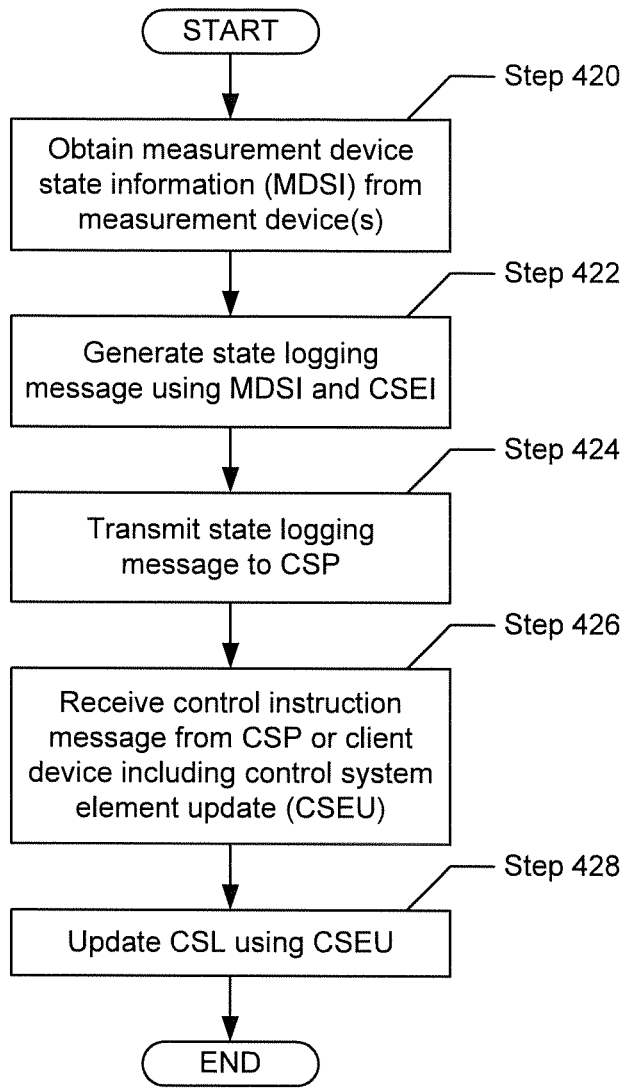
FIG. 4B shows a flowchart in accordance with one or more embodiments of the disclosure.

FIG. 4B shows a flowchart describing a method for updating the CSL of a CSE in accordance with one or more embodiments of the disclosure. In Step 420, measurement device state information (MDSI) is obtained. In one or more embodiments of the disclosure, the obtaining of MDSI may involve the periodic sampling and recording/storing of one or more output(s) of one or more measurement device(s) operatively connected to the CSE. Subsequently, MDSI may correspond to raw measurement data, normalized measurement data, or otherwise pre-processed measurement data from the one or more measurement device(s) that is sampled and recorded/stored.

In Step 422, a state logging message is generated. In one or more embodiments of the disclosure, a state logging message may be generated to include (or using) at least the MDSI (obtained in Step 420) and the CSEI associated with the CSE. In one or more embodiments of the disclosure, generation of the state logging message may be triggered by, for example, determining that the number of measurements obtained from one or more measurement device(s) has reached or exceeded a predefined number of measurements threshold, determining that the file (or storage medium) size recording/storing the obtained MDSI has reached or exceeded a predefined file (or storage medium) size threshold, and the like.

In Step 424, the state logging message (generated in Step 422) is transmitted. In one or more embodiments of the disclosure, the state logging message may be transmitted using any wired and/or wireless communication protocol, and may traverse through any wired and/or wireless network towards reaching its destination. The destination of the configuration request message may be the CSP. One of ordinary skill in the relevant art would appreciate that the state logging message may be transmitted in the form of one or more network data packets.

In Step 426, a control instruction message is received. In one or more embodiments of the disclosure, the control instruction message may traverse through any wired and/or wireless network, and employ any wired and/or wireless communication protocol, in arriving at the CSE from its source. The source of the control instruction message may be the CSP or a client device. Further, the control instruction message may or may not be received in response to the transmitting of the state logging message (in Step 424). In one or more embodiments of the disclosure, the control instruction message may include at least a CSEU for the CSE. As discussed above, in one or more embodiments of the disclosure, the CSEU may include adjustments and/or updates for the CSL operating on the CSE. One of ordinary skill in the relevant art would appreciate that the configuration response message may be received in the form of one or more network data packets. Accordingly, in Step 428, the CSL of the CSE is updated (or rewritten) using the CSEU (received in Step 426).

Figure 5A:
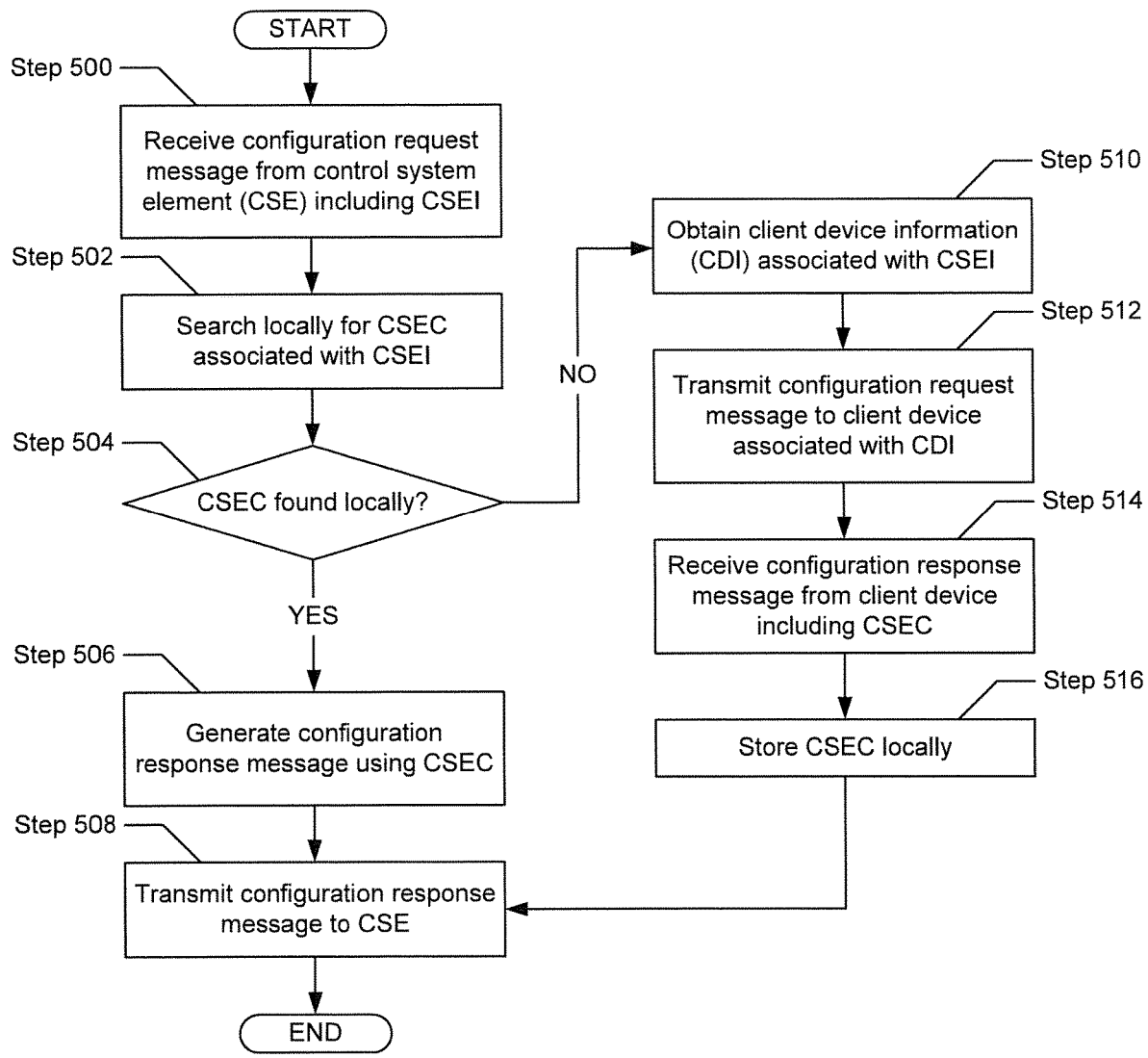
FIG. 5A shows a flowchart in accordance with one or more embodiments of the disclosure.

FIG. 5A shows a flowchart describing a method for transmitting a configuration response message in accordance with one or more embodiments of the disclosure. In Step 500, a configuration request message is received. In one or more embodiments of the disclosure, the configuration request message may traverse through any wired and/or wireless network, and employ any wired and/or wireless communication protocol, in arriving at the CSP from its source. The source of the configuration request message may be a CSE. As discussed above, in one or more embodiments of the disclosure, the configuration request message may include at least a CSEI associated with a requesting CSE. One of ordinary skill in the relevant art would appreciate that the configuration request message may be received in the form of one or more network data packets.

In Step 502, a local search for a CSEC is performed. In one or more embodiments of the disclosure, performing a local search may involve accessing the data repository (see e.g., FIG. 3) on the CSP and looking for a CSEC, using the CSEI. Performing of the local search may further involve referring to a storage space or memory location designated for the CSE (and referred to using the CSEI). In one or more embodiments of the disclosure, the CSEC for a CSE may be included as at least a portion of client device information (CDI) stored in the data repository.

In Step 504, a determination is made as to whether a CSEC has been found locally. If it is determined that the local search (performed in Step 502) has resulted in the locating of a CSEC, the process proceeds to Step 506. On the other hand, if it is determined that the local search has been unable to locate a CSEC, the process proceeds to Step 510.

In Step 506, in determining that a CSEC has been found locally, a configuration response message is generated. In one or more embodiments of the disclosure, the configuration response message may be generated to include (or using) at least the CSEC found locally.

In Step 508, the configuration response message (generated in Step 506 or obtained in Step 514 (discussed below)) is transmitted. In one or more embodiments of the disclosure, the configuration response message may be transmitted using any wired and/or wireless communication protocol, and may traverse through any wired and/or wireless network towards reaching its destination. The destination of the configuration response message may be a requesting CSE. One of ordinary skill in the relevant art would appreciate that the configuration request message may be transmitted in the form of one or more network data packets.

In Step 510, in determining that a CSEC has not been found locally, client device information (CDI) is obtained. As mentioned above, in one or more embodiments of the disclosure, CDI may be representative of a client profile that may include, but is not limited to, the CDNC, client preferences directed to analytic information computation and presentation, protocols for the transmission of analysis notification messages, network identification information (e.g., a unique Internet Protocol (IP) address associated with an appropriate client device), etc. Further, the CDI may be obtained from the data repository on the CSP using the CSEI (received in Step 500) as a key. More specifically, in Step 510, the network identification information for an appropriate client device (associated with the control system that includes the requesting CSE) is retrieved.

In Step 512, the configuration request message (received in Step 500) is redirected to the appropriate client device. In one or more embodiments of the disclosure, network headers encapsulating the configuration request message may be partially modified to replace a destination IP address associated with the CSP to the IP address (e.g., network identification information) associated with the appropriate client device (and obtained in Step 510). In one or more embodiments of the disclosure, the configuration request message may be redirected using any wired and/or wireless communication protocol, and may traverse through any wired and/or wireless network towards reaching the appropriate client device. One of ordinary skill in the relevant art would appreciate that the configuration request message may be redirected in the form of one or more network data packets, and that the network headers of each network data packet would need to be modified as described above in order for the network data packets to reach their redirected destination.

In Step 514, a configuration response message is received. In one or more embodiments of the disclosure, the configuration response message may traverse through any wired and/or wireless network, and employ any wired and/or wireless communication protocol, in arriving at the CSP from its source. The source of the configuration response message may be a client device. Further, the configuration response message may be received in response to the redirecting of the configuration request message (in Step 512). In one or more embodiments of the disclosure, the configuration response message may include at least a CSEC for the CSE. One of ordinary skill in the relevant art would appreciate that the configuration response message may be received in the form of one or more network data packets.

In Step 516, the CSEC included in the configuration response message (received in Step 514) is stored locally. In one or more embodiments of the disclosure, the CSEC may be stored in the data repository of the CSP. Further, the CSEC may be stored in a storage space or memory location designated for the CSE (and referred to using the CSEI). In one or more embodiments of the disclosure, the CSEC for a CSE may be included as at least a portion of CDI stored in the data repository. From here, the process proceeds to Step 508.

Figure 5B:
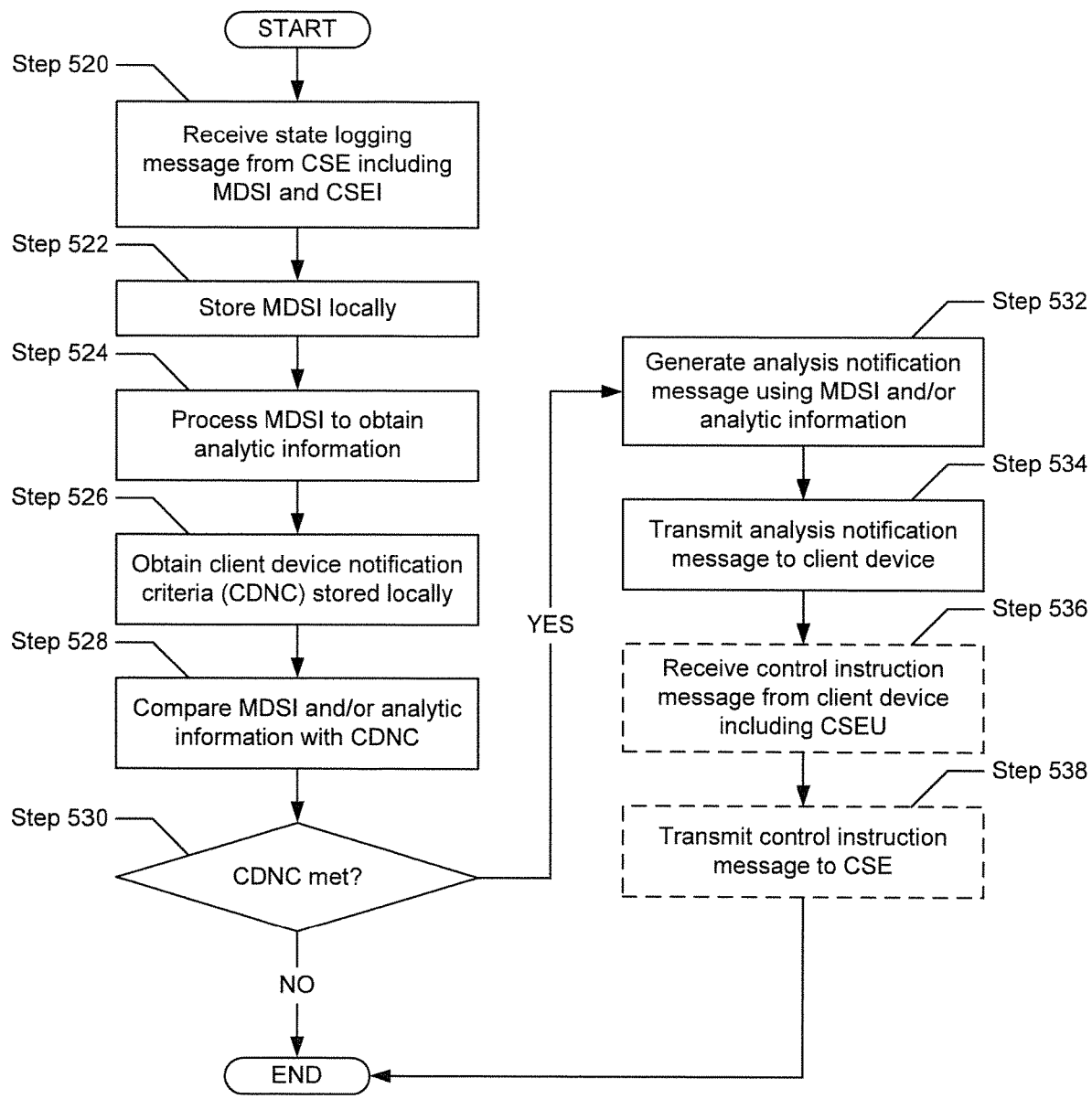
FIG. 5B shows a flowchart in accordance with one or more embodiments of the disclosure.

FIG. 5B shows a flowchart describing a method for transmitting an analysis notification message in accordance with one or more embodiments of the disclosure. In Step 520, a state logging message is received. In one or more embodiments of the disclosure, the state logging message may traverse through any wired and/or wireless network, and employ any wired and/or wireless communication protocol, in arriving at the CSP from its source. The source of the configuration request message may be a CSE. As discussed above, in one or more embodiments of the disclosure, the state logging message may include at least MDSI and a CSEI associated with a CSE. One of ordinary skill in the relevant art would appreciate that the configuration request message may be received in the form of one or more network data packets.

In Step 522, the MDSI included in the state logging message (received in Step 520) is stored locally. In one or more embodiments of the disclosure, the MDSI may be stored in the data repository of the CSP. Further, the MDSI may be stored in a storage space or memory location designated for the CSE (and referred to using the CSEI). In one or more embodiments of the disclosure, the MDSI for a CSE may be included as at least a portion of CDI stored in the data repository.

In Step 524, MDSI is processed to obtain analytic information. In one or more embodiments of the disclosure, the MDSI that is processed may include the recently received MDSI (of Step 520) and/or already consolidated (or historical) MDSI retrievable from the data repository of the CSP. As mentioned above, the data and/or information resulting from the performance of one or more analyses on the MDSI may be collectively referred to as analytic information. Further details regarding the analyses performed is discussed above with respect to FIG. 3.

In Step 526, client device notification criteria (CDNC) associated with the CSE is obtained. In one or more embodiments of the disclosure, the CDNC may be stored locally in the data repository of the CSP. Further, the CDNC may be stored in a storage space or memory location designated for the CSE (and referred to using the CSEI (received in Step 520)). In one or more embodiments of the disclosure, the CDNC may be included as at least a portion of CDI stored in the data repository. As mentioned above, the CDNC may specify one or more time-based and/or event-based triggers for generating analysis notification messages. Further details regarding the CDNC is discussed above with respect to FIG. 3.

In Step 528, a comparison is performed between the MDSI (and/or analytic information) and the CDNC (obtained in Step 526). In Step 530, a determination is made as to whether, based on the comparison (performed in Step 528), the CDNC is met by the MDSI and/or the analytic information. If it is determined that the CDNC has been met, the process proceeds to Step 532. On the other hand, if it is determined that the CDNC has not been met, the process ends.

In Step 532, after determining that the CDNC has been met based on the comparison of the CDNC and the MDSI and/or analytic information, an analysis notification message is generated. In one or more embodiments of the disclosure, the analysis notification message may be generated to include (or using) the relevant MDSI and/or analytic information. The relevant MDSI and/or analytic information pertains to at least a portion of the MDSI and/or analytic information, which meets at least a corresponding portion of the CDNC.

In Step 534, the analysis notification message is transmitted. In one or more embodiments of the disclosure, the analysis notification message may be transmitted using any wired and/or wireless communication protocol, and may traverse through any wired and/or wireless network towards reaching its destination. The destination of the configuration request message may be a client device specified by CDI associated with the control system that includes the CSE. One of ordinary skill in the relevant art would appreciate that the state logging message may be transmitted in the form of one or more network data packets.

In Step 536, a control instruction message is received. In one or more embodiments of the disclosure, the control instruction message may traverse through any wired and/or wireless network, and employ any wired and/or wireless communication protocol, in arriving at the CSP from its source. The source of the control instruction message may be a client device. Further, the control instruction message may or may not be received in response to the transmitting of the analysis notification message (in Step 534). In one or more embodiments of the disclosure, the control instruction message may include at least a CSEU for the CSE. As discussed above, in one or more embodiments of the disclosure, the CSEU may include adjustments and/or updates for the CSL operating on the CSE. One of ordinary skill in the relevant art would appreciate that the configuration response message may be received in the form of one or more network data packets.

In Step 538, after receiving the control instruction message (in Step 536), the control instruction message is redirected to the CSE. In one or more embodiments of the disclosure, network headers encapsulating the control instruction message may be partially modified to replace a destination IP address associated with the CSP to the IP address (e.g., network identification information) associated with the CSE. In one or more embodiments of the disclosure, the control instruction message may be redirected using any wired and/or wireless communication protocol, and may traverse through any wired and/or wireless network towards reaching the CSE. One of ordinary skill in the relevant art would appreciate that the control instruction message may be redirected in the form of one or more network data packets, and that the network headers of each network data packet would need to be modified as described above in order for the network data packets to reach their redirected destination.

Figure 6A:
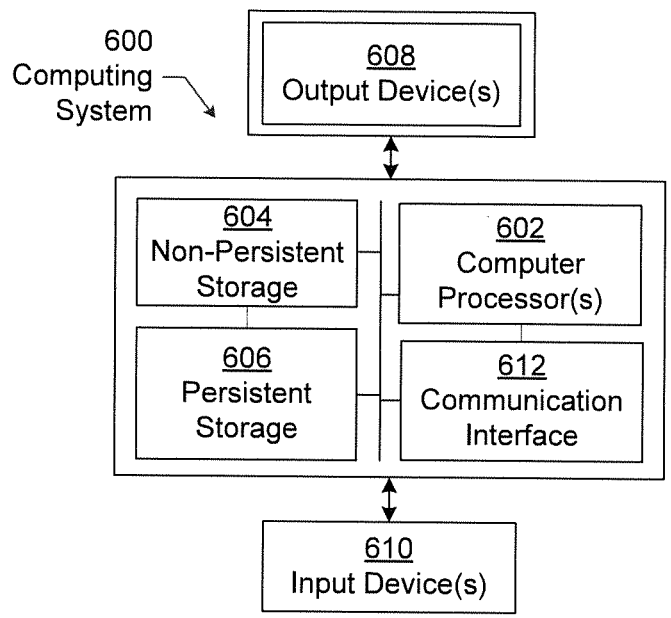
FIG. 6A shows a computing system in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system 4) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
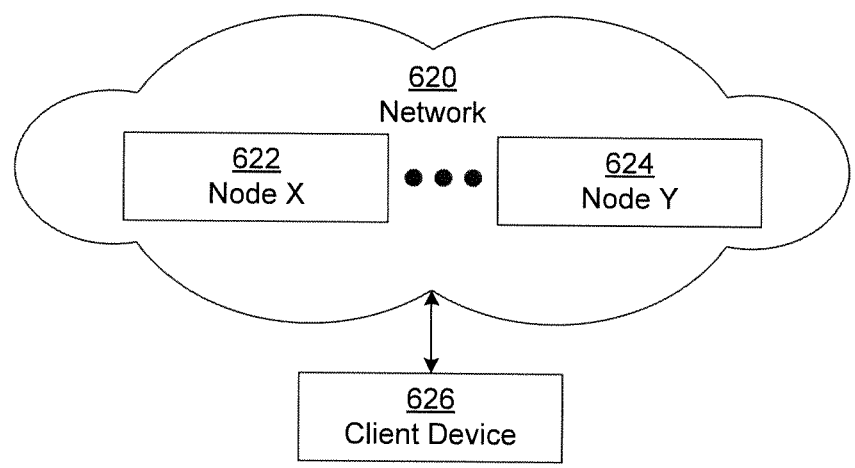
FIG. 6B shows a computing system in accordance with one or more embodiments of the disclosure.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A system, comprising:
   a plurality of smart meter blocks; and
   a control system platform (CSP) comprising a data repository, a computer processor and a memory and operatively connected to the plurality of smart meter blocks, and configured to:
      receive, from a smart meter block of the plurality of smart meter blocks, a state logging message comprising measurement device state information (MDSI) and a control system element identifier (CSEI), wherein the state logging message is generated when determining a number of measurements obtained from the MDSI has reached or exceeded a predefined number of measurements threshold and determining that a file size of the MDSI has reached or exceeded a predefined file size threshold;
      store the MDSI in the data repository;
      process the MDSI to obtain analytic information;
      obtain, from the data repository, client device notification criteria (CDNC) associated with the CSEI;
      perform a comparison between the MDSI and the analytic information against the CDNC;
      determine, based on the comparison, that at least one notification trigger specified in the CDNC has been met;
      generate, in response to the determining, an analysis notification message comprising the MDSI and the analytic information; and
      transmit the analysis notification message to a client device operatively connected to the CSP via a network.

2. The system according to claim 1, wherein each smart meter block-comprises:
   a processor;
   a measurement processor that receives MDSI from one or more measurement devices; a control transmitter that transmits control device state information (CDSI) to at least one control device;
   a communication interface.

3. The system according to claim 1, wherein at least one smart meter block-receives configuration parameters from the CSP.

4. The system according to claim 2, wherein the processor processes MDSI received by the measurement processor and creates output data.

5. The system according to claim 4, wherein computational parameters are associated and transmitted with the output data.

6. The system according to claim 4, wherein a signature of the computational parameters is associated and transmitted with the output data.

7. The system according to claim 6, wherein the signature is encrypted.

8. The system according to claim 2, wherein hypertext transfer protocol (HTTP) is used by the communication interface.

9. The system according to claim 2, wherein message queuing telemetry transport (MQTT) is used by the communication interface.

10. The system according to claim 2, wherein at least one smart meter block-comprises a field programmable gate array for real-time MDSI capture.

11. The system according to claim 1, wherein at least one smart meter block-streams unprocessed MDSI to the client device.

12. The system according to claim 1, wherein at least one smart meter block-streams unprocessed MDSI to the CSP.

13. A method for setting control system logic (CSL) of and using a smart meter block, the method comprising:
   providing a smart meter block and a control system platform (CSP), the CSP comprising a data repository, a computer processor, and a memory, wherein the CSP is operatively connected to the smart meter block;
   upon activation of the smart meter block, searching locally for a control system element configuration (CSEC);
   determining whether the CSEC is found locally;
   when the CSEC is found locally:
      setting the CSL using the CSEC; and
   when the CSEC is not found locally:
      generating a configuration request message using a control system element identifier (CSEI);
      transmitting the configuration request message to the CSP;
      transmitting the configuration request message from the CSP to the smart meter block;
      receiving, by the smart meter block, the configuration request message from the CSP setting the CSL using the CSEC;
   the method further comprising, at the CSP:
      receiving, from the smart meter block, a state logging message comprising measurement device state information (MDSI) and a control system element identifier (CSEI), wherein the state logging message is generated when determining a number of measurements obtained from the MDSI has reached or exceeded a predefined number of measurements threshold and determining that a file size of the MDSI has reached or exceeded a predefined file size threshold;
      storing the MDSI in the data repository;
      processing the MDSI to obtain analytic information;
      obtaining, from the data repository, client device notification criteria (CDNC) associated with the CSEI;

performing a comparison between the MDSI and the analytic information against the CDNC;

determining, based on the comparison, that at least one notification trigger specified in the CDNC has been met;

generating, in response to the determining, an analysis notification message comprising the MDSI and the analytic information; and transmitting the analysis notification message to a client device operatively connected to the CSP via a network.

14. A method for setting control system logic (CSL) of and using a smart meter block, the method comprising:

providing a smart meter block and a control system platform (CSP), the CSP comprising a data repository, a computer processor, and a memory, wherein the CSP is operatively connected to the smart meter block;

upon activation of the smart meter block, searching locally for a control system element configuration (CSEC); determining whether the CSEC is found locally;

when the CSEC is found locally:
setting the CSL using the CSEC; and when the CSEC is not found locally:
generating a configuration request message using a control system element identifier (CSEI);

transmitting the configuration request message to the CSP;

transmitting the configuration request message from the CSP to the smart meter block;

receiving, by the smart meter block, the configuration request message from the CSP setting the CSL using the CSEC, wherein the CSEC is a programming language script that mandates a behavior of the smart meter block;

the method further comprising, at the CSP:
receiving, from the smart meter block, a state logging message comprising measurement device state information (MDSI) and a control system element identifier (CSEI), wherein the state logging message is generated when determining a number of measurements obtained from the MDSI has reached or exceeded a predefined number of measurements threshold and determining that a file size of the MDSI has reached or exceeded a predefined file size threshold;

storing the MDSI in the data repository;

processing the MDSI to obtain analytic information;

obtaining, from the data repository, client device notification criteria (CDNC) associated with the CSEI;

performing a comparison between the MDSI and the analytic information against the CDNC;

determining, based on the comparison, that at least one notification trigger specified in the CDNC has been met;

generating, in response to the determining, an analysis notification message comprising the MDSI and the analytic information; and transmitting the analysis notification message to a client device operatively connected to the CSP via a network.

15. A method for transmitting a configuration response message, the method comprising:

providing a system comprising a plurality of smart meter blocks and a control system platform (CSP), the CSP comprising a data repository, a computer processor and a memory and operatively connected to the plurality of smart meter blocks, wherein the CSP is configured to:

receive, from a smart meter block of the plurality of smart meter blocks, a state logging message comprising measurement device state information (MDSI) and a control system element identifier (CSEI), wherein the state logging message is generated when determining a number of measurements obtained from the MDSI has reached or exceeded a predefined number of measurements threshold and determining that a file size of the MDSI has reached or exceeded a predefined file size threshold;

store the MDSI in the data repository;

process the MDSI to obtain analytic information;

obtain, from the data repository, client device notification criteria (CDNC) associated with the CSEI;

perform a comparison between the MDSI and the analytic information against the CDNC;

determine, based on the comparison, that at least one notification trigger specified in the CDNC has been met;

generate, in response to the determining, an analysis notification message comprising the MDSI and the analytic information; and transmit the analysis notification message to a client device operatively connected to the CSP via a network;

receiving a configuration request message from the smart meter block, the configuration request message comprising the CSEI;

searching locally for a control system element configuration (CSEC); determining whether the CSEC is found locally;

when the CSEC is found locally:
generating the configuration response message, the configuration response message comprising the CSEC found locally; and transmitting the configuration response message to the smart meter block; and when the CSEC is not found locally:
obtaining client device information (CDI), the CDI comprising the CDNC, client preferences directed to analytic information computation and presentation, protocols for transmission of analysis notification messages, or network identification information;

transmitting the configuration request message to a transmitting client device, wherein the transmitting client device may be the same as the client device;

receiving, by the CSP, the configuration response message from the transmitting client device, wherein the configuration response message comprises a CSEC of the configuration response message for the smart meter block;

storing the CSEC of the configuration response message locally; and transmitting the CSEC of the configuration response message to the CSEC.

* * * * *